United States Patent
Wentz et al.

(10) Patent No.: US 10,742,421 B1
(45) Date of Patent: Aug. 11, 2020

(54) METHODS AND SYSTEMS FOR ANONYMOUS HARDWARE ATTESTATION

(71) Applicant: Ares Technologies, Inc., Cambridge, MA (US)

(72) Inventors: Christian Wentz, Providence, RI (US); Ilia Lebedev, Cambridge, MA (US); Anna Iysyanskaya, Providence, RI (US)

(*) Notice: Subject to any disclaimer, the term of this patent is extended or adjusted under 35 U.S.C. 154(b) by 0 days.

(21) Appl. No.: 16/682,371

(22) Filed: Nov. 13, 2019

Related U.S. Application Data

(60) Provisional application No. 62/815,527, filed on Mar. 8, 2019.

(51) Int. Cl.
  H04L 9/32 (2006.01)
  G06F 21/57 (2013.01)
  H04L 9/08 (2006.01)

(52) U.S. Cl.
  CPC ............ H04L 9/3247 (2013.01); G06F 21/57 (2013.01); H04L 9/0891 (2013.01); H04L 9/3234 (2013.01); H04L 9/3236 (2013.01); H04L 2209/42 (2013.01)

(58) Field of Classification Search
  CPC ............... H04L 9/3247; H04L 63/0421; H04L 63/0823; G06F 2221/2017; G06F 21/64; G06F 21/33
  USPC ........................................................ 713/176
  See application file for complete search history.

(56) References Cited

U.S. PATENT DOCUMENTS

| | | | |
|---|---|---|---|
| 7,581,107 B2* | 8/2009 | Camenisch | G06Q 30/04 713/176 |
| 9,258,130 B2 | 2/2016 | Hwang et al. | |
| 9,467,292 B2 | 10/2016 | Nahari | |
| 9,935,773 B2 | 4/2018 | Sarangdhar et al. | |
| 10,397,005 B2 | 8/2019 | Brickell | |
| 2006/0010079 A1* | 1/2006 | Brickell | G06Q 20/3674 705/67 |
| 2008/0307223 A1 | 12/2008 | Brickell et al. | |
| 2019/0020647 A1 | 1/2019 | Sinha et al. | |

(Continued)

FOREIGN PATENT DOCUMENTS

WO    2018150154    8/2018

OTHER PUBLICATIONS

Xiaofeng et al, Direct Anonymous Attestation for Next Generation TPM, Dec. 2008, Journal of Computers, vol. 3, No. 12, pp. 43-50.*

(Continued)

*Primary Examiner* — Alexander Lagor
*Assistant Examiner* — Jenise E Jackson
(74) *Attorney, Agent, or Firm* — Caldwell Intellectual Property Law

(57) ABSTRACT

A method performing anonymous hardware attestation. A local software monitor is loaded at an originating device. The local software monitor may receive at least a command to execute at least a program and execute the at least a program by performing a series of authentications. Originating device activates a secure computing module located within originating device to generate a secure proof a device specific secret of the originating device. The originating device generates a digital signature conferring a credential on the local software module. The originating device deactivates the secure computing module upon generating the digital signature.

17 Claims, 6 Drawing Sheets

(56) References Cited

U.S. PATENT DOCUMENTS

2019/0312734 A1 10/2019 Wentz et al.
2019/0319790 A1 10/2019 Fenner

OTHER PUBLICATIONS

Othman et al, 2010, IEEE, Forming Virtualized Secure Framework for Location Based Services (LBS) Using Direct Anonymous Attestation (DAA) protocol, pp. 622-629.*

Bamasak, et al., A Collusion-Resistant Distributed Signature Delegation Based on Anonymous Mobile Agent, https://pdfs.semanticscholar.org/f6c4/93689220472b3448900654648dfb87365f9a.pdf.

* cited by examiner

METHODS AND SYSTEMS FOR ANONYMOUS HARDWARE ATTESTATION

CROSS-REFERENCE TO RELATED APPLICATIONS

This application claims the benefit of priority of U.S. Provisional Patent Application Ser. No. 62/815,527, filed on Mar. 8, 2019, and titled "METHODS AND SYSTEMS FOR ANONYMOUS HARDWARE ATTESTATION," which is incorporated by reference herein in its entirety.

FIELD OF THE INVENTION

The present invention generally relates to the field of computer security. In particular, the present invention is directed to methods and systems for anonymous hardware attestation.

BACKGROUND

Credentials can be delegated from one device to another. Unfortunately, certification chains consisting of attested credentials can be readily trackable and display private information such as public keys to all users on a system. This can be a problem when a key pair is linked to a particular person or manufacturer.

SUMMARY OF THE DISCLOSURE

A system for anonymous hardware attestation includes an originating device including a secure computing module, the secure computing module including a device identifier circuit designed and configured to generate a secure proof of a device-specific secret of the originating device. The originating device includes an originating processor 128 configured to activate the secure computing module. The originating processor 128 is configured to load a local software monitor configured to receive at least a command to execute at least a program on the originating device, generate at least a first cryptographic hash of the at least a command, digitally sign the at least a first cryptographic hash of the at least command, and execute the at least a program. The originating device is configured to generate a digital signature conferring a credential to the local software module and signing a message including an identifier of the local software monitor, wherein generating further comprises generating a secure proof of the device-specific secret using the device identifier circuit and a verification datum of the device-specific secret. The originating device is configured to deactivate the secure computing module.

A method of anonymous hardware attestation includes activating, by the originating device, a secure computing module, the secure computing module including a device identifier circuit configured to generate a secure proof of a device specific secret of the originating device. The method includes loading, at an originating device, a local software monitor, wherein the local software monitor is configured to receive at least a command to execute at least a program on the originating device, generate at least a first cryptographic hash of the at least a command, digitally sign the at least a first cryptographic hash of the at least a command, and execute the at least a program. The method includes generating, by the originating device, a digital signature conferring a credential to the local software module and signing an identifier of the local software monitor, wherein generating further comprises generating a secure proof of the device-specific secret using the device identifier circuit and a verification datum of the device-specific secret. The method includes deactivating, by the originating device, the secure computing module.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
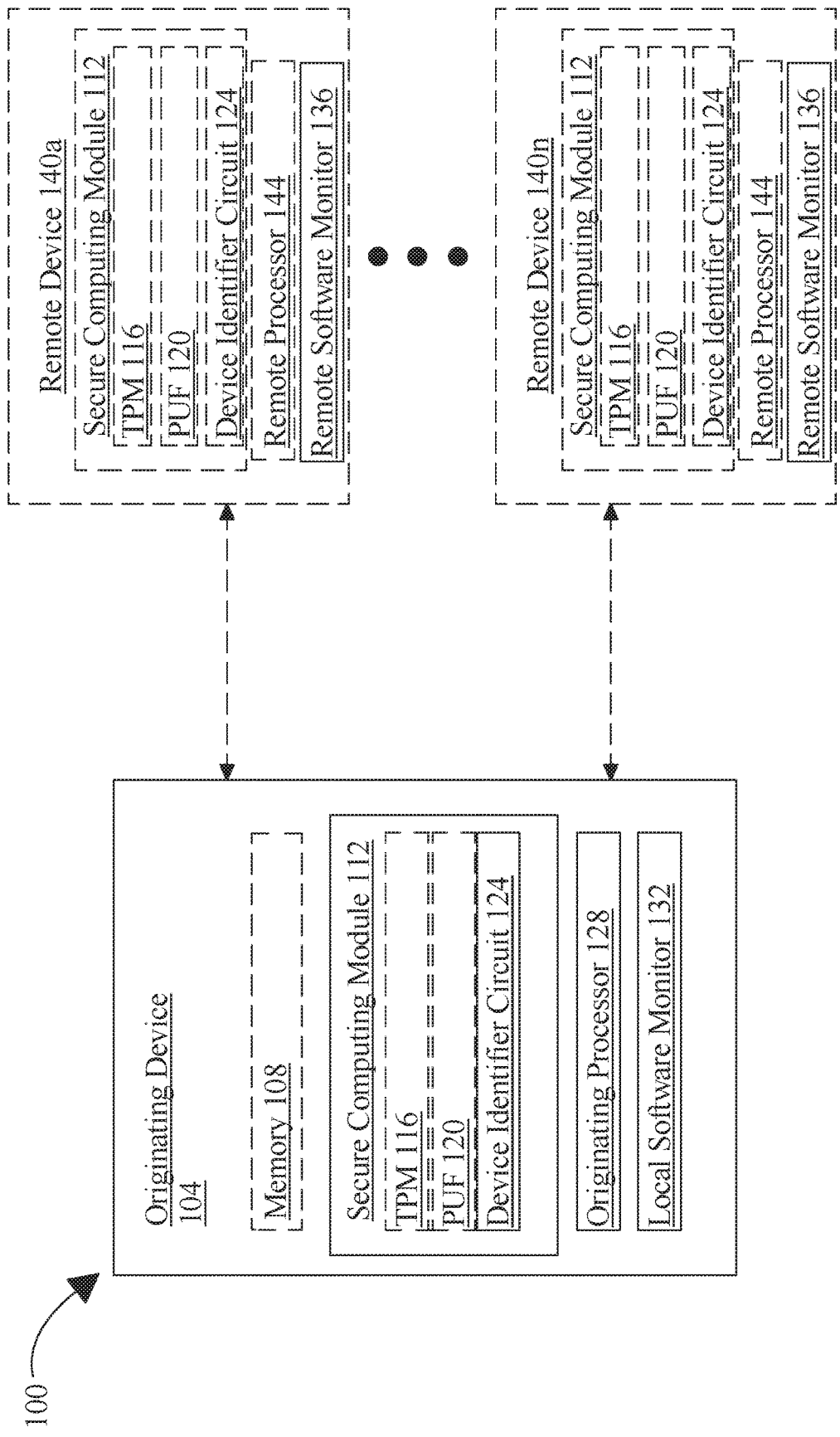
FIG. 1 is a block diagram illustrating an exemplary embodiment of a system for anonymous hardware attestation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for anonymous hardware attestation. In an embodiment, an originating device is able to generate anonymous attestation credentials that can be utilized to verify a local software monitor running on the originating device. In an embodiment, originating device may load a local software and generate a digital signature conferring a credential on the local software monitor, which may attest to adherence to attested computing protocols in initialization of the software monitor. Software monitor may in turn sign processes such as remote software monitors operating on remote devices, applications initialized and measured by software monitor or remote software monitors, and the like. Each such authorization may maintain anonymity as to originating device, software monitor, remote software monitors, and/or remote devices while allowing for all devices and/or processes in a chain of attestation so established to be checked for compliance with attested programming protocols. Attested computing in turn may permit verification of executed program steps, inputs to programs, outputs from programs, and/or data stored and/or manipulated thereby. Attestation chain may allow for subsequent devices downstream in the arrestation chain to perform authentication without identification of previous devices upstream in the attestation chain.

In an embodiment, methods and systems described herein may perform and/or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 of anonymous hardware attestation is illustrated. System 100 includes an originating device 104. Originating device 104 may include any computing device as described in this disclosure. Originating device 104 may include a processor. Originating device 104 may include a single computing device operating independently, or may include two or more computing devices operating in concert, in parallel, sequentially or the like. Originating device 104 may incorporate, be in communication with, or otherwise utilize a secure computing module as described below in further detail.

With continued reference to FIG. 1, originating device may include any computing device as described in this disclosure, including without limitation a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), and/or system on a chip (SoC) as described in this disclosure. Originating device may include, be included in, and/or communicate with a mobile device such as a mobile telephone, smartphone, wearable device, Augmented Reality/Virtual Reality (AR/VR) device, tablet, or the like. Originating device may include, be included in, and/or communicate with a server, cloud compute environment or the like. Originating device may include a single computing devices operating independently, or may include two or more computing device operating in concert, in parallel, sequentially or the like; two or more computing devices may be included together in a single computing device or in two or more computing devices. originating device may interface or communicate with one or more additional devices as described below in further detail via a network interface device. Network interface device may be utilized for connecting originating device to one or more of a variety of networks, and one or more devices. A network may employ a wired and/or a wireless mode of communication. In general, any network topology may be used. Information (e.g., data, software etc.) may be communicated to and/or from a computer and/or a computing device. originating device may include but is not limited to, for example, a computing device or cluster of computing devices in a first location and a second computing device or cluster of computing devices in a second location. Originating device may include one or more computing devices dedicated to data storage, security, distribution of traffic for load balancing, and the like. Originating device may distribute one or more computing tasks as described below across a plurality of computing devices of computing device, which may operate in parallel, in series, redundantly, or in any other manner used for distribution of tasks or memory between computing devices. Originating device may be implemented using a "shared nothing" architecture in which data is cached at the worker, in an embodiment, this may enable scalability of system 100 and/or computing device. Originating device may be at least a controller for at least a software defined network (SDN) or at least a content delivery network (CDN).

Still referring to FIG. 1, originating device 104 and/or any component thereof including without limitation a secure computing module and/or an originating processor as described in further detail below may be designed and/or configured to perform any method, method step, or sequence of method steps in any embodiment described in this disclosure, in any order and with any degree of repetition. For instance, originating device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Originating device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Originating device may boot a single processor core via the processes described herein, load at least a local software monitor on the at least a single processor core, and subsequently utilize the first software monitor to boot serially or in parallel subsequent processor cores on the same processor or other processor. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, originating device 104 may include and/or be communicatively connected to at least a memory 108. Communicative connecting may be performed via a bus or other facility for intercommunication between elements of a computing device. Communicative connecting may include fabrication together on a shared integrated circuit and/or wafer; for instance, and without limitation, one or more device identifier circuits may be combined in a single monolithic unit or module. At least a memory 108 may include, without limitation, one or more elements of read-only memory. At least a memory 108 may include one or more elements of execute-only memory. At least a memory 108 may include one or more dedicated cache lines or isolated memory modules; for instance, some of memory 108 may be accessible only to master device 104. In an embodiment, memory 108, or a portion thereof, may be physically connected only to originating device 104; as a result, only originating device 104 may be physically capable of accessing memory 108 and/or portion thereof. This may, for instance, prevent attacks wherein a non-secure processor is induced to recover memory entries to which non-secure processor and/or attacker is not authorized access, for instance by using speculative execution race condition exploits, buffer overrun exploits, or the like. Alternatively or additionally, originating device 104 and/or a processor of originating device 104 and/or connected thereto is further configured to permit a memory access operation to an address in the memory by a requesting processor only after an access privilege operation indicates that the requesting processor has access rights to the address. Thus, for instance, a command to load an item from memory 108 to a register, CPU cache, or the like may be preceded by a process to determine whether requesting process, component, or entity has access to that item; this protocol may prevent exploitation of a race condition whereby memory loading to the register, cache, or other location may precede determination of access rights, enabling adversaries to obtain data to which they do not have access during a window prior to determination that access is denied. Memory 108 may incorporate a trusted non-volatile storage device that provides some means of verification of secure storage capability and other properties.

With continued reference to FIG. 1, originating device 104 may electrically isolate sections of memory 108 and/or signal routing via patterning of high impedance dielectric materials, voltage isolation wells in a silicon substrate, selective patterning of metal layers above, below, adjacent to any sensitive element, and configuring the voltage level of such metal layers to obfuscate the electrical behavior of the memory and/or signal routing. Originating device 104 may include dedicated cache lines or other physically isolated memory devices; input to and output from such physically isolated memory devices may be possible only through a secure computing module as describe below, and/or be controlled by the secure computing module.

With continued reference to FIG. 1, originating device 104 includes a secure computing module 112. As used herein, a secure computing module 112 is a hardware or software element configured to perform one or more secured operations beyond the control of other circuit elements or software, whether incorporated with the secure computing module 112 in a circuit or computing device, or a part of an extrinsic computing device. As a result, at least one secured operation performed by secure computing module 112 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 112 and/or a system or computing device incorporating secure computing module 112 based on the above-described set of assumptions. As a non-limiting, example, a secure computing module 112 designed to produce an expected result despite all software-only attacks may give rise to a first confidence level, whereas another secure computing module 112 designed to produce its expected result in the face of all software or hardware attacks may give rise to a second confidence level; the second confidence level may be higher, owing to the reduced probability that the second secure computing module 112 would be compromised.

Still viewing FIG. 1, secure computing module 112 may include a trusted platform module (TPM 116). In an embodiment, a TPM 116 may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM 116 may have any suitable elements of digital or analog circuitry usable to perform one or more processes as described herein, including without limitation processes used to determine confidence levels and/or authenticate digitally signed assertions as described below. TPM 116 may have memory and/or other logic and/or a processor in its own right which may be in a non-limiting example a crypto processor. TPM 116 may have a hard-coded process, e.g. via protected ROM or secure flash, for signing a digital signature, which may be performed using any digital signature and/or digital signature protocol described in this disclosure, including without limitation using a private key, which may be associated with a public key, and/or a class of public keys, and/or may be a private key of a symmetric cryptographic system. TPM 116 may be configured to incorporate a secure enclave and/or protocols for performing attestation on behalf of an untrusted or less trusted hardware or software element, e.g. TPM 116 may be configured to have attestation requests from such a less trusted element relayed to it for secure signing, and may include packaging of signed data for use in an attestation protocol, representative embodiments of which are included in this disclosure. For instance, and without limitation, TPM 116 may sign enclave attestations; as a non-limiting example, an enclave such as an SGX enclave or the like may be attested to using long-lived security of device keys inside the TPM 116. This private key and/or signing process may be performed using any digital signature and/or digital signing protocol described in this disclosure. For instance, and without limitation, a private key, signature, and/or signing process may be produced using a genuinely random process during manufacturing and/or at a later stage, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be determined and/or extracted using PUF processes, for instance and without limitation using a fuzzy extractor, key extractor physically unclonable function, and/or other software techniques. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 112 may include at least PUF 120. PUF 120 may be implemented by various means. In an embodiment, PUF 120 includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photo-multipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF 120 may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF 120 may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF 120 in an embodiment include without limitation buskeeper PUFs, which may be similar to other PUFs based on bistable memory elements but leveraging buskeeper cells. PUF 120 may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

In an embodiment, and still viewing FIG. 1, PUF 120 may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUT response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204*a-b*. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF 120 may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF 120 may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF 120 that may be used may include, without limitation, nano electromechanical (NEM) PUFs. NEM PUFs may include PUFs that leverage stiction of a silicon nanowire to a binary gate structure. NEM PUFs may include those based on interfacial magnetic anisotropy energy, such as use of the random distribution of magnetization orientation originating from the sub-nanometer variation of oxide layer produced by the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF 120 and/or TPM 116; such outputs may be used to generate symmetric or asymmetric keys, private keys, zero-knowledge proofs, or other proofs of authenticity, as described in further detail below.

Continuing to refer to FIG. 1, secure computing module 112 may implement one or more secure memory storage protocols. One or more secure memory storage protocols may be protocols designed to prevent unauthorized access to memory and/or to protect secure computing module 112 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 112. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 112 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 112 may use hardware-enabled access control to protect memory access; hardware access control may, as a non-limiting example, be performed by tagging each memory entry with a "container identifier" corresponding to a page, file, or other grouping of memory, enabling secure computing module 112 to determine whether tampering has occurred.

Still referring to FIG. 1, secure computing module 112 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 112 may operate using one or more dedicated memory objects, registers, or storage elements; as a non-limiting example, secure computing module 112 may operate with dedicated cache lines not available to other processes or circuits, preventing, e.g., stack or buffer overrun attacks to corrupt or steal data. Dedicated memory elements may be wired only to secure computing module 112; access to dedicated memory elements may be rendered impossible except by way of secure computing module 112. Secure computing module 112 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 112 may utilize oblivious random-access memory (RAM) wherein memory access patterns are obfuscated to prevent detection of memory access patterns by outside observers attempting to deduce execution details regarding processes performed using secure computing module 112. Secure computing module 112 and/or device incorporating secure computing module 112 may incorporate a trusted non-volatile storage device that provides some means of verification of secure storage capability and other properties. Memory protocols as described above may be used to implement methods of attested storage and the chain of trust beginning at PUF 120 level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 112.

Still referring to FIG. 1, secure computing module 112 may include a secure processor. Secure processor may be a processor as described in this disclosure. Secure processor may operate autonomously from other processors and/or an operating system operating on at least a cryptographic evaluator; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor; digitally signing may be performed using any form of digital signature described in this disclosure. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM 116, to frustrate alteration and/or probing to discover and/or alter private keys. Private keys may be demonstrable as uniquely associated with secure processor by use of PUF 120 as described above; secure processor may include, for instance, a TPM 116 as described above. Alternatively or additionally, a certificate authority as described above, which may be a manufacturer of secure processor, may verify that one or more public keys are associated uniquely with secure processor according to any protocol suitable for digital certificates.

Still referring to FIG. 1, examples of a secure computing modules 112 may include, without limitation, TPM 116 as described above. The secure computing module 112 may include TPM 116 combined with a boot-measuring protocol using hash trees, Merkle trees, or the like to measure boot entries to create an "attested boot," additionally or separately from the attested computation description described above. A secure computing module 112 may include a trusted execution technology (TXT) module combining a TPM 116 with establishment of a secure container at run-time; secure container may be isolated from a software stack and OS of at originating device 104 and/or use TPM 116 to measure and attest to secure container prior to launch. Secure computing module 112 may implement a trusted enclave, also known as a trusted execution environment (TEE) or secure enclave. In an embodiment, a trusted enclave may be a portion of a computing device that is isolated from the main processor of the computing device. Isolation may be achieved using elements of secure computing module 112 as described above, including isolation of memory. Isolation of memory may be achieved through any process or architecture as described above for secure memory, including encryption using a cryptographic system a decryption and/or encryption key to which a secure processor or TPM 116 has access, but to which a CPU or other main processor, as well as input/output devices or connections, does not and/or use of dedicated cache lines or the like to physically separate memory accessible to secure computing module 112 from CPU and/or input/output devices or connections. Inputs and outputs to and from trusted enclave may be restricted and controlled tightly by a secure processor and/or TPM 116 as described above, including software security monitors.

Trusted enclaves may be considered protected memory primitives in which the program stack and stack pointer are reset prior to loading of code into the enclave and flushed prior to exiting trusted enclave operation. In general trusted enclaves may be defined as hardware or software primitives that prohibit unauthorized access to memory segments during execution of sensitive code, including via access to processor caches. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. The Sanctum architecture and Ascend secure infrastructure from MIT, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., RISC-V physical memory protection (PMP) based isolated software modules, and/or any other suitable architecture. Persons skilled in the art, upon reviewing the entirety of this disclosure, will be aware of various additional or alternative trusted computing processes that may be used to implement secure computing module 112, TEE, or trusted enclaves as disclosed herein. System 100 may incorporate or communicate with a certificate authority (CA), public key infrastructure (PKI), distributed CA or distributed PKI.

Still referring to FIG. 1, secure computing module may include a device identifier circuit 124. Device identifier circuit 124 may include any form of circuit suitable for use as any other component described herein, including without limitation an integrated circuit and/or a circuit configured using software, including without limitation key ladders, a device identifier circuit 124 is configured to produce at least a secure proof of a device-specific secret of originating device 104. Device identifier circuit may include a software-defined circuit; in other words, device identifier circuit may include and/or consist of a software program implemented on a component of secure computing module 112 and/or originating device 104. Device identifier circuit 124 may include any means and/or components to create a cryptographic identity within the device. Device identifier circuit may select and/or generate a device identifier, device-specific secret, secure proof, and/or cryptographic identity at random every time device identifier circuit is invoked, at every boot and/or attested boot, or the like. A device-specific secret, as used herein, is a piece of information uniquely linked to a device, such as originating device, and/or a module thereof, including without limitation a secure computing module 112, a TPM 116, a PUF 120, or the like, where uniqueness indicates a very low probability that any other device has been manufactured to generate the device-specific secret, and a manufacturer performing this method does not manufacture any other device configured to generate the device-specific secret. As a non-limiting example, the device-specific secret may include a private key of a public-key cryptographic system as described above. Alternatively or additionally, device-specific secret may include one or more numbers randomly generated by originating device 104 and/or a component thereof; one or more numbers may be sufficiently large, and generated in a sufficiently random way, to ensure that one or more numbers are unique to originating device 104 and/or a component thereof. Various protocols exist to ensure that a number or other element of data may be unique as defined above; examples include the globally unique identifier (GUID) and/or universally unique identifier (UUID) protocol, for instance as standardized by the Open Software Foundation. Generally, where a number represented by a sufficient number of binary bits or the equivalent is derived by a random process, probability of a duplicate number being independently generated may be essentially zero; for instance, a randomly selected number output using n bits (assuming a simple binary encoding as opposed to a twos complement scheme) may have any value between 0 and $2^n$, making the probability of any process producing the same number $\frac{1}{2}^n$; thus, for instance, the probability of a device or process independently generating a 1000-bit number having the same output as another such device is approximately $10^{-300}$. Outputs may be truly random in an embodiment, by utilizing various designs or methods as described below. Persons skilled in the art, upon reviewing the entirety of this disclosure, will be aware of various ways in which device-specific secrets may be generated as described herein, including without limitation through use of various components and/or methodologies disclosed below.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, a secure proof may be used to generate a digital signature. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In an embodiment, and continuing to refer to FIG. 1, a digital signature may be used to delegate a credential to a process or device. For instance, and without limitation, a credential may be delegated from a first device having a first private key to a second device having a second private key by the first device signing a message containing a public key associated with the second private key, enabling the second device to demonstrate that it is the recipient of the credential by signing with the second private key. A digital signature may have a property of unlinkability; that is, digital signature may be delegated from one device to another in a way that makes digital signature impossible or practically infeasible to use for deduction of a granting device or of a digital signature that was previously used to derive and/or generate digital signature. In an embodiment, and without limitation, this may be accomplished as described in Provisional Application No. 62/815,493, filed on Mar. 8, 2019, and entitled "METHODS AND SYSTEMS FOR IMPLEMENTING AN ANONYMIZED ATTESTATION CHAIN," the entirety of which is incorporated herein by reference. A digital signature may have a property of delegatability, as defined and/or described in Provisional Application No. 62/815,493.

Figure 2:
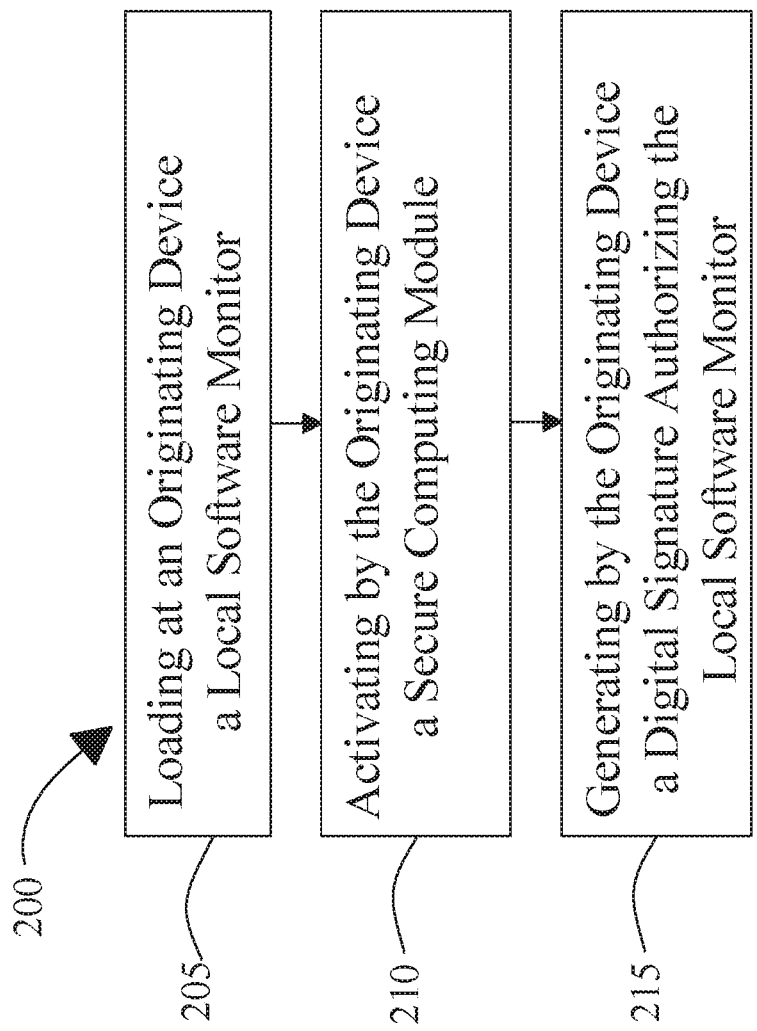
FIG. 2 is a flow diagram illustrating an exemplary embodiment of a method of anonymous hardware attestation.

Still viewing FIG. 2, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 2, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing hardware apparatus as described in further detail below; in such scenarios, authentication may include proof by the secure computing hardware apparatus that the secure computing hardware apparatus possesses a secret key to a public key/certificate pair.

In some embodiments, persons, devices, or transactions may be authenticated or assigned a confidence level using digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a cryptographic evaluator as described in further detail below. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

In an embodiment, a certificate authority may include a manufacturer of a device. For instance, manufacturer may verify that a private key, or secret usable to produce a secure proof as set forth in further detail below, available to a device is associated with one or more devices produced by the manufacturer; verification may take the form of a digital signature created by the manufacturer, signing a verification datum and/or public key corresponding to the private key and/or secret belonging to the device. Private key and/or secret may be device-specific or may be issued to a group of devices; in the latter case, a device signing with private key and/or generating a secure proof based on secret may convey that it belongs to that group of devices, without making it possible for a device evaluating the signature and/or secure proof to identify the specific device. A group of devices so identified may have characteristics in common, such as instances and/or versions of hardware, firmware, or other elements, including without limitation secure computing modules as described in further detail below; identification that device is in group may, for instance, indicate that device may be trusted to a certain degree, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where a group has been compromised, given a lower confidence level, or the like, individual devices in group having device-specific secrets or private keys may sign transactions with such keys, sacrificing a degree of anonymity to differentiate themselves from compromised members of such groups. Group keys and/or secrets may be embedded in hardware of devices during manufacture, as described in further detail below. Group keys and/or secrets may be assigned and/or signed by devices other than manufacturers; group keys and/or assignment of group keys may be used in direct anonymous attestation as described in further detail below. Group keys may enable processes of identification and/or attestation, such as without limitation direct anonymous attestation, to be performed in which a digital signature and/or secure proof confirms that an entity and/or device is part of a group but cannot determine which member of a group it is. In an embodiment, a group key may be characterized by a shared public key/verification datum, which matches a set of private keys, each of which is issued to a different recipient and is distinct from each other one, such that knowledge of a first private key does not enable discovery of a second private key associated with the public key.

Certificate authority may be implemented in a number of ways, including without limitation as described in Provisional Application No. 62/758,367, filed on Nov. 9, 2018, and entitled "METHOD AND SYSTEMS FOR A DISTRIBUTED CERTIFICATE AUTHORITY," the entirety of which is incorporated herein by reference; for instance, and without limitation, certificate authority may include, be included in, and/or be implemented as a distributed certificate authority as described in Provisional Application No. 62/758,367.

Still referring to FIG. 1, in an embodiment of device identifier circuit 124 may include a circuit that performs secure multiparty computation; circuit may be produced by first simulating a circuit to perform secure proof, then transforming the circuit to implement a secure multiparty computation generating the same secure proof. In an embodiment, transformation further includes transformation of input terminals, such as at least an exterior input terminal and/or at least an interior input terminal to furnish inputs to the secure multiparty computation circuit. In an embodiment, a first oblivious transfer circuit connects at least a secret generator module to at least an interior input terminal. First oblivious transfer circuit may include any tamper-proofing. A second oblivious transfer circuit may connect to at least an exterior input; second oblivious transfer circuit may, for instance, perform an oblivious transfer of secret share inputs based upon at least a datum to be digitally signed, or at least a challenge provided pursuant to a challenge-response protocol. In operation, inputs from at least a secret generator module and inputs via at least an exterior input may be combined within device identifier circuit 124 to produce the secure proof via at least an exterior output. As a result, the ability to determine inputs to device identifier circuit, and the ability to prove proof-generation circuit, may still not be sufficient to determine device-specific secret. The input production may further be divided between two or more secret generator modules of at least a secret generator module, such as two PUF circuits as practical for ideal production and security thereof, and/or may be divided between two or more categories of PUF. Additionally or alternatively, at least a secret generator module may include at least a pre-shared secret key, via lithographic process, configuration of eFuse, EPROM or other one-time programmable memory element, or the like. Such a pre-shared secret may be used directly or as input to at least a key derivation function, a one-time use secret, and the like.

Still referring to FIG. 1, of device identifier circuit 124 may include a circuit implementing a hard-coded process for producing secure proof. For instance, a logic circuit may be constructed that signs a digital signature, which may be performed using a private key generated by TPM, PUF, secure computing module 112, and/or another component of originating device 104. As a non-limiting example, device identifier circuit 124 may include a logic circuit that receives as inputs from at least an exterior input terminal 128 an element of data to be signed using a digital signature and an input from at least a TPM, PUF, secure computing module 112, and/or another component of originating device 104 via at least an interior input terminal produced as a function of at least a device-specific secret, and output via at least an external output terminal a digital signature signing the element of data using a private key derived using the input from the at least an internal input terminal.

Still referring to FIG. 1, in an embodiment device identifier circuit 124 and/or key extractor 120 may be constructed with one or more tamper-proofing or obfuscation techniques to defeat invasive or non-invasive analysis thereof. This may be accomplished using any means or method, component, or element suitable for the generation of at least a non-analyzable circuit element 112 as described above.

Still viewing FIG. 1, device identifier circuit 124 may be configured to perform a direct anonymous attestation (DAA) protocol. In an embodiment, DAA is an anonymous digital signature scheme, which instead of reliance on a certificate authority to link a particular private key to a particular party, uses reference to a group public key or to multiple public keys to verify an anonymous signature. Device identifier circuit 124 may act as a "first signer" of a digital signature, signing with a private key produced from a secret generator module as described above, which may be a group key. In an embodiment device identifier circuit 124 signs an element of data using the private key. A second signer, which may include a manufacturer device or another device endorsing key and/or secret used for first signing may previously or subsequently sign the element of data and/or a verification datum associated with the secure proof and/or digital signature used for first signing; alternatively or additionally, second signer may use information or signature elements provided by device identifier circuit 124 and/or at least a secret generator module to perform a digital signature. This process may, for instance, enable generation of novel secret keys using additional circuitry, to demonstrate, for instance, timeliness of execution and frustrate delay-based attacks. DAA may perform digital signature using a zero-knowledge proof; for instance, any non-interactive zero-knowledge proof and/or zero-knowledge proof that may be made non-interactive may be used to generate digital signature, where signature may be, for instance, the proof algorithm output, while verification program, trusted setups where needed, or the like may be publicly available for evaluation of digital signature, i.e. of the proof. Similar processes may be performed, such as without limitation Intel EPID. Where a manufacturer or other device signs group public key and/or verification datum, such signature may be provided, distributed to one or more verifying nodes, or the like.

In an embodiment, and continuing to refer to FIG. 1, secure computing module 112 may be implemented as a discrete component and/or subsystem of originating device 104. Alternatively or additionally, secure computing module 112 may be implemented at least in part by configuration of one or more components of originating device 104 to implement secure computing module 112 and/or a component or portion thereof. Secure computing device 112 may include any combination of discrete and/or isolated elements and/or components of originating device 104 with any configuration of other components of originating device 104 such as a CPU, GPU, MCU, an originating processor as described in further detail below, and/or any software and/or firmware operating thereon. Secure computing module 112 may, as a non-limiting example, be configured in any combination as described above to perform a secure boot process. A secure boot process may be performed according to any process and/or protocol described in this disclosure. For instance, and without limitation, a processor (CPU, MCU) may be programmed with trusted boot code, which may be measured boot code. Boot code may be keyed; for instance, binary of boot code may be or have been generated by a trusted party and hashed or hashed and encrypted with a key, a corresponding key of which may be integrated into trusted loader software that loads the boot code, provided the key corresponds to what is expected. Boot code may be checked against a hash so described to ensure consistency, and if so, may proceed to start a main program or subsequent stage, which may include without limitation at least a local software monitor as described below, before or after a Kernel or any other stand-alone Executable and Linkable Format (ELF), such as iPXE, gPXE, Etherboot or similar, UEFI, or BIOS, any of which in turn may load a Kernel. Loading at least a software monitor may include loading at least a local software monitor and/or fetching at least a remote software monitor whose location(s) may be included in the trusted bootloader binary, or any previous step (location(s) may be e.g. IP address via network connection or via local I/O address, memory mapped address, and the like). Loading a software monitor may include configuring at least a first secure enclave. A trusted loader may erase system memory and clear system state prior to and/or after loading the boot code and/or software monitor; this process may be performed as part of deactivation of secure computing module 112 as set forth in further detail below.

With continued reference to FIG. 1, originating device 104 includes an originating processor 128. Originating processor 128 may include any processor and/or processors as described in this disclosure. Originating processor 128 may operate autonomously from other processors and/or an operating system operating on at least a cryptographic evaluator; for instance, originating processor 128 may store entries in temporary or long-term memory in encrypted form, where decryption is impossible without private keys not available to devices, circuits or software besides originating processor 128. Encryption may likewise be impossible without private keys available only to originating processor 128. Originating processor 128 may also digitally sign memory entries using, for instance, a private key available only to originating processor 128. Keys available only to originating processor 128 may include keys directly encoded in hardware of the originating processor 128; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Originating processor 128 may be constructed, similarly to TPM 116, to frustrate alteration and/or probing to discover and/or alter private keys. Private keys may be demonstrable as uniquely associated with secure processor by use of PUF 120 as described above; secure processor may include, for instance, a TPM 116 as described above. Alternatively or additionally, a certificate authority as described above, which may be a manufacturer of secure processor, may verify that one or more public keys are associated uniquely with originating processor 128 according to any protocol suitable for digital certificates.

With continued reference to FIG. 1, originating processor 128 may be designed and configured to load a local software monitor. As used herein, a software monitor is a software component that operates either above in privilege, or before in sequence, any untrusted components of system 100. As a non-limiting example of the former, local software monitor may operate in a privilege mode of a processor above an operating system and hypervisor, such as an originating processor 128 as described above, such as without limitation machine mode in the non-limiting example of the RISC-V processor ISA and may have exclusive access to a portion of memory for a period of time, such as dynamic random-access memory (DRAM). As a non-limiting example of the latter, local software monitor may execute prior to an operating system, hypervisor, and/or other software in order to establish some invariants/restrictions and/or to measure later-activated software; a notion of "privilege" may be implied through this sequencing of operations instead of being a supported property by originating device 104, system 100, or components thereof. Significant software may be activated before activation and/or involvement of local software monitor, such as without limitation firmware, microcode, BIOS, or the like; in an embodiment, components and/or software elements operating prior to and/or above local software monitor may be part of a trusted computing base for system 100 and may be trusted as part of the hardware. Alternatively or additionally, embodiments of local software monitor, and/or of any other components and/or software elements described herein, may be deployed in or used to attest a software-only setting such as attestation of, e.g., Kubernetes containers. In general, local software monitor may implement measurement and facilitate attestation and/or ensure that a security policy of system 100 maintains isolation of mutually distrusting components. Local software monitor 132 includes a software monitor generated at originating device 104. Local software monitor may check allocation decisions of software operating on system 100 such as originating device 104 and or a plurality of processors and/or computing devices making up at least a first remote device 140*a-n* for correctness and commit them into hardware configuration registers. Local software monitor may maintain a register of owners of protection domains via unique identifier and the associated domains, in non-limiting example associated memory address spaces. Such software may include without limitation operating system, kernel, hypervisor, and/or guest OS. In this nomenclature, an operating system handles scheduling and demand paging, and a hypervisor may multiplex CPU cores of originating device 104 and/or at least a first remote device 140*a-n*. A "remote device," as used herein, may include a separate device from originating device 104 and/or other CPU cores on originating device 104, and/or other hardware subsystems on a system on chip. Applications signed by and/or monitored by local software monitor, for instance as described in further detail below, may include virtual machine containers such as without limitation docker or Kubernetes containers, web browsers, and/or applications. In a representative embodiment, local software monitor 132 may intermediate untrusted system software handling of isolated machine resources. Local software monitor may include a local software monitor key. Local software monitor key may be used to check the authenticity of the local software monitor. Local software monitor key may be generated by random variation in selection of prime numbers, for instance for the purposes of a cryptographic system such as RSA that relies on prime factorization difficulty. A key need not be and/or include a prime number. Local software monitor key may be generated by randomized selection of parameters for a seed in a cryptographic system, such as elliptic curve cryptography, which is generated from a seed. Local software monitor key may be used to generate exponents for a cryptographic system such as Diffie-Helman or ElGamal that are based on the discrete logarithm problem. Local software monitor key may include a single key such as a public key or may include a key pair such as a private and public key pair. In an embodiment, a private and public key pair may be utilized wherein a public key may be used for encryption of a message and a corresponding private key may be used for decrypting an encrypted message. Local software monitor key may include device specific secret. Originating processor 128 may load local software monitor at boot time. Loading of local software monitor may include an evaluation of the integrity of local software monitor and/or cryptographic authentication. Evaluation of integrity may be done in non-limiting example via comparison of local software monitor's cryptographic measurement to at least a hash function output included in the local software monitor and/or located in other memory communicatively coupled to the boot loader. Cryptographic authentication may utilize a time synchronized one-time password generator, in non-limiting example an RSA SecureID token where a device specific secret acts as the seed for a secret generator whose secret output is updated at regular time intervals. Boot time may include the time period when a computer is started up such as for example when power is switched on.

Still referring to FIG. 1, attested boot processes as described above may be performed to load and/or initialize a trusted system in which a trusted software infrastructure signs and/or initializes a software monitor and/or a software object and/or application; trusted software infrastructure may be generated from a hardware root of trust such as a secure computing module 112 and/or component thereof as described above, acting as a remote and/or local software monitor. Alternatively or additionally, trusted software infrastructure may perform a role of a secure computing module 112 as described above; that is, where trusted software infrastructure is trusted according to any protocol, including certification by certificate authorities or the like, trusted software infrastructure may perform any action described above as performed by secure computing module 112 and/or local software monitor, for instance using digital signatures associated with a source of trust of the trusted software infrastructure, including without limitation any digital certificate and/or authorization token as described in this disclosure. As a non-limiting example, a trusted software infrastructure may host one or more mutually distrusting containers, such as Kubernetes, docker, virtual machines, or the like; Attestation of these containers may follow any process for attested boot and/or attested computing as described in this disclosure. Everything before a "boot time," however implemented, may be trusted, while everything after is "measured", allowing a user of system 100 and/or a device interacting with system 100 to decide whether or not they it should trust the system based on whether this measurement belongs to a set of expected values.

Loading local software monitor by the originating processor 128 may include utilizing the secure computing module. Local software monitor 132 may verify decisions made by software operating on originating device 104 and/or at least a first remote device 140*a-n* for any events that may cause change in the protection domain/privilege mode of originating device 104 and/or at least a first remote device 140*a-n*, including without limitation interrupts and fault handling, and may configure low level hardware resources when in at least a particular privilege mode. Hardware resources may include, without limitation, memory, such as physical memory pages, cache lines, processor cores that include all microarchitectural state, L1, L2, last layer cache and register files, and other resources. Local software monitor 132 may consider isolated protection domains including the monitor itself, enclaves, and untrusted software. Local software monitor 132 may ensure that resource allocation for one protection domain may not be modified by any other domain.

Local software monitor 132 may be configured to perform delegation of authorization to a software application, where delegation includes generating a delegation signature including a secure proof of possession of the local software monitor key and an identifier of the software application. Delegation may include authorizing a remote device to run local software monitor. Identifier of the software application may include a verification datum associated with a software application key and/or generating a measurement of the software application.

Continuing to refer to FIG. 1, to ensure protection domains are enforced, local software monitor 132 may enforce resource state transitions, which may occur in a non-limiting example as follows: if a resource requested is owned by owner (current user) or local software monitor 132 itself, the resource may be blocked. A requesting OS may demand the resource, in which case the sensitive processor state may be cleaned, and resource made available; finally, the OS may grant the resource to a new owner. Local software monitor 132 may include a map of resource to owner, and lock on resource. These resource metadata may be pre-allocated to the monitor's binary image in case of statically partitioned resources such as cores and cache partitions. Local software monitor 132 may contain a cryptographic measurement (e.g. a hash) of certificates, keys, and of at least a first enclave. In an embodiment, local software monitor 132 may include an associated base address/address mask pair register in hardware that protects the location of the local software monitor 132 in memory space from corruption, bitmapped protected memory provisions, and the creation of page tables for each enclave within protected memory. Local software monitor is designed and configured to receive at least a command to execute on the originating device 104, generate at least a first cryptographic hash of the at least a command, digitally sign the at least a first cryptographic hash of the at least command, and execute the at least a program, where execution of the program may happen after secure computing module has been deactivated.

With continued reference to FIG. 1, originating processor 128 is designed and configured to generate a digital signature conferring a credential to the local software module and signing a first message including an identifier of the local software monitor, wherein generating further comprises generating a secure proof of possession of the device-specific secret using the device identifier circuit. Generating may include generating a secure proof of possession of the device specific secret using the device identifier circuit, wherein the secure proof includes an identifier of the local software monitor. Device specific secret as used herein includes any secret element of data not revealed to devices in general, such as without limitation a secret key or private key. Device specific secret may include a hardware generated secret such as by secure computing module. Device specific secret may be specific to originating device 104. Generating by the originating processor 128 a digital signature authorizing the local software module may include generating a secure proof of the device-specific secret using the device identifier circuit. proof may include any of the secure proofs as described above. This may include for example a PUF. Secure proof generated by the originating processor 128 may identify the local software monitor. Identifier of the local software monitor may include a verification datum linked with the local software monitor key. Verification datum as used herein, may be or include any datum that may be used to aid in evaluation of device specific secret. For example, where device specific secret includes a digital signature generated using a private key of a public key cryptographic system, verification datum may include a corresponding public key. Similarly, where device specific secret includes a zero-knowledge proof, verification datum may include verification data useable to verify zero knowledge proof. In an embodiment, device specific secret may be linked to verification datum whereby verification datum may function as or be a portion of device specific secret. Identifier may include a measurement of the local software monitor; measurement may include without limitation a cryptographic hash of source code, compiled and/or executable code, inputs, and/or outputs of a program or module such as local software monitor.

With continued reference to FIG. 1, originating processor 128 may be designed and configured to perform any method step or steps as disclosed herein, in any order or combination, and with any degree of repetition; as a non-limiting example, originating processor 128 may be designed and configured to load a local software monitor, and generate a digital signature authorizing the local software module.

With continued reference to FIG. 1, local software monitor may include, load, execute, and/or delegate to a remote software monitor 136. Remote software monitor 136 may include any software monitor as described above, which may perform any function that local software monitor may perform. In an embodiment, remote software monitor 136 may be identical to local software monitor except that remote software monitor 136 may be located on a remote device 140*a-n* whereas local software monitor may be located on originating device 104. Remote software monitor 136 may be installed from originating device 104 rather than from hardware root code or the like. Remote software monitor 136 may be configured to install at least a second remote software monitor 136 on at least a second device. Remote software monitor 136 may include a remote software monitor key. Remote software monitor 136 may include a remote software monitor key. Remote software monitor key may be used to check the authenticity of the remote software monitor 136. Remote software monitor key may be generated by random variation in selection of prime numbers, for instance for the purposes of a cryptographic system such as RSA that relies prime factoring difficulty. Remote software monitor key may be generated by randomized selection of parameters for a seed in a cryptographic system, such as elliptic curve cryptography, which is generated from a seed. Remote software monitor key may be used to generate exponents for a cryptographic system such as Diffie-Helman or ElGamal that are based on the discrete logarithm problem. Remote software monitor key may include a single key such as a public key or may include a key pair such as a private and public key pair. Remote device 140*a-n* may include any computing device or devices as described in this disclosure. Remote software monitor 136 may be designed and configured to perform any method step or steps as disclosed herein, in any order or combination, and with any degree of repetition. As a non-limiting example, remote software monitor 136 may be designed to receive at least a program to execute on a remote device 140*a-n*, generate at least a first cryptographic hash of the at least a program, sign the at least a first cryptographic hash of the at least a program with the remote software monitor key and execute the at least a program.

With continued reference to FIG. 1, originating device 104 may communicate with at least a first remote device 140*a-n*; at least a first remote device 140*a-n* may include any device or devices as described above. At least a first remote device 140*a-n* may include, for example, any computing device or devices as described in this disclosure. At least a first remote device 140*a-n* may include secure computing module 112. At least a first remote device 140*a-n* may include remote software monitor 136. Remote software monitor may include any of the software monitors as described above. At least a first device may include a remote processor 144. Remote processor may include any of the processors as described in this disclosure. First remote device may be configured to install second remote software monitor on a second device. In an embodiment, originating device 104 may communicate with at least a first remote device 140a-n through a communication network. Connection to communication network may include connection via a network interface card (e.g., a mobile network interface card, a LAN card), a modem, any other wired or wireless means usable for connection to a communication network, and/or any combination thereof. A communication network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Originating device 104 may be designed and configured to perform any method step or steps as disclosed herein, in any order or combination, and with any degree of repetition; as a non-limiting example, originating device 104 may be designed and configured to load a local software monitor, wherein the local software monitor includes a local software monitor key, activate a secure computing module, wherein the secure computing module includes a device identifier circuit 124 configured to generate a secure proof of a device-specific secret of the originating device 104, generate a digital signature authorizing the local software module wherein generating includes generating a secure proof of the device specific secret using the device identifier circuit 124 and the secure proof includes an identifier of the local software monitor, and deactivate the secure computing module. Authorization of software module via software monitor may include restrictions to specific time of day, time range, date range, and the like, total duration of operation as enforced in non-limiting example via a monotonic counter routine and signature, specific device user or user group, specific geographic region of operation, specific host device type as enforced in non-limiting example via evaluation of cryptographic measurement of a device identifier, group key, or other means of identifying device class, specific host device identity, specific host device subsystem, in non-limiting example the audio controller, video controller, user input capture device such as mouse, keyboard, touchscreen, gesture capture device and the like, display controller, and the like. Restrictions may be specified as any combination of the preceding non-limiting examples.

With continued reference to FIG. 1, originating processor 128 may include and/or be configured to utilize any number of components that may be incorporated in a computing device as described herein, including without limitation a server, desktop or laptop computer, GPU, TPU, FPGA, CPLD, embedded computer such as mobile phone, tablet, and/or gaming system, or the like. In nonlimiting example where originating processor 128 is a microcontroller or CPU, enforcement of keyed access to the boot code, and/or loading of local software monitor, may be performed via a hardware or software defined security element, such as in nonlimiting example trusted platform module (TPM), Platform Controller Hub, Baseboard Management Controller (BMC), Northbridge, Southbridge, silicon root of trust such as OpenTitan as promulgated by the LowRISC Foundation of Cambridge, UK, Titan chip as promulgated by Google of Mountain View, Calif., USA, Azure Sphere MCU and/or Microsoft Pluton as promulgated by Microsoft of Redmond, Wash., USA, ARM TrustZone as promulgated by ARM holdings of Cambridge, UK, iLO subsystem as promulgated by Hewlett Packard Enterprise of San Jose, Calif., or other component with direct or indirect access to and/or from the originating processor 128. In nonlimiting example, boot code and/or local software monitor may be stored in memory with some means of access control, such as a flash memory chip or Read Only Memory (ROM), where access from originating processor 128 to memory may be mediated directly or indirectly by the security element. In nonlimiting example, where originating processor 128 is or includes a programmable logic device such as an FPGA or CPLD, an additional step may include loading of hardware description bitfile. Such loading may be secured via similar keyed hash or hash process as described above. Originating processor 128 may be or include an analog or mixed signal device, where weights are programmed by any number of means, and the verification of the weights be done via decryption via cryptographic key, via computation of a hash, via keyed hash, or the like.

Referring now to FIG. 2, a method 200 of anonymous hardware attestation is illustrated. At step 205 an originating device 104 activates a secure computing module. Secure computing module may include any secure computing module 112 as defined in this disclosure. Secure computing module includes a device identifier circuit 124 configured to generate a secure proof of a device specific secret of originating device 104. Secure proof may include any secure proof as described above in FIGS. 1-2. Secure proof may be generated by the device identifier circuit 124. Device identifier circuit 124 may include any component as described above in FIG. 1. Secure proof may include a PUF. PUF may include any of the PUFs as described above in FIG. 1. Secure proof may identify local software monitor. Secure proof may identify local software monitor, hardware device, hardware subsystems, time of execution, location of execution, and the like singly or in any combination. For example, proof may identify time of a particular operation by attesting the integrity of local device clock relative to a reference clock sourced via at least a network time protocol (NTP) server, the receipt of NTP datum being authenticated in nonlimiting example via keyed hash authentication code (HMAC) using device-and-software specific signature taking as input the current local device time or proxy, e.g. a monotonic counter value, and the NTP datum. In a similar fashion, the authenticity of a given sensed parameter, e.g. geospatial location, may be established. Such proof of local time may be deemed valid for a period of time beyond initial authentication if the clock source is protected from tampering. Period of validity may be fixed or variable based upon the drift properties of the clock source.

Still referring to FIG. 2, identifier and/or secure proof may include and/or demonstrate distinctiveness that is unique only to local software monitor 132. Identifier may include for example, a verification datum linked with local software monitor key. Verification datum may include any datum that may assist in evaluating device specific secret as described above in FIG. 1. For example, where device specific secret includes a digital signature generated using a private key of a public key cryptographic system, verification datum may include a corresponding public key. Verification datum may assist in evaluating authenticity of device specific secret and/or local software monitor. Similarly, where device specific secret includes a zero-knowledge proof, verification datum may include verification data useable to verify zero knowledge proof. Identifier such as verification datum may be linked to device specific secret, so that verification datum is presented in conjunction with device specific secret. In an embodiment, verification datum may include a private key that may belong to a group of devices, thereby making it possible to link verification datum to a group of devices. A group of devices so identified may have characteristics in common, such as instances and/or versions of hardware, firmware, or other elements, including without limitation secure computing modules as described in further detail below; identification that device is in group may, for instance, indicate that device may be trusted to a certain degree, or be granted a certain confidence level, by virtue of degrees to which its secure computing module may be trusted to perform authentic attested processes or the like. Manufacturer and/or devices participating in embodiments of systems as described herein may receive, assign, or generate confidence levels associated with such group identities, including without limitation assignment of lower or minimal confidence levels for groups with regard to which a vulnerability to hacking or exploits has been identified, a group one member of which has been associated with an illegal, fraudulent, or undesirable act, a group one member of which has been compromised, hacked, or stolen, or the like. In an embodiment, where a group has been compromised, given a lower confidence level, or the like, individual devices in group having device-specific secrets or private keys may sign transactions with such keys, sacrificing a degree of anonymity to differentiate themselves from compromised members of such groups. Group keys and/or secrets may be embedded in hardware of devices during manufacture.

With continued reference to FIG. 2, identifier may include a measurement of local software monitor; measurement may be any measurement of local software monitor as described above. Measurement of local software monitor may assist in evaluating authenticity of originating device 104 and/or local software monitor.

At step 210, and still referring to FIG. 2, originating device 104 loads a local software monitor. Loading as used herein includes running local software monitor 132 on originating device 104. Loading local software monitor 132 may occur at boot time when originating device 104 is first started up and initiated. Loading may include identifying an isolated memory space on originating device 104. Isolated memory space may include any of the isolated memory space as described above in FIG. 1; isolated memory space may include all memory of originating device 104. Loading may include clearing isolated memory space on originating device 104. Clearing may include zeroing isolated memory space and/or setting the isolate memory space to a uniform value to achieve a known initial state. Loading may include utilizing secure computing module. Secure computing module may load local software monitor by initiating it to run on originating device 104. Upon initiation of local software monitor, secure computing module may shut off or may enter a dormant phase. Originating device 104 may deactivate secure computing module 112 after local software monitor 132 has been loaded. Deactivation may include shutting off secure computing module 112 or allowing secure computing module 112 to enter a dormant phase. Local software monitor 132 may be loaded from a hardware memory device, including without limitation a read-only memory and/or execute-only memory device. Performance of deactivation by originating device and/or originating processor 128 may include locking out and/or switching off one or more hardware or software components; for instance, a trusted loader and/or boot code, which may have access to cryptographic keys to e.g. launch the software monitor, may be locked out, which may mean in an embodiment that keys, signatures, tokens, circuits, and/or secrets required to access it are inaccessible to the rest of code and/or components. Such locking out may be enforced by any number of means, such as without limitation a permissioned access process which is disabled following execution of boot code. This may be enforced using any number of methods described herein and others as will be apparent to those of ordinary skill in the art.

With continued reference to FIG. 2, a secure boot and/or attested boot process may be used to achieve trustworthiness of software monitor. Originating device 104 may execute a chain of attested boot upon reset to prove that the software monitor has not been tampered with. This may be performed during loading by originating processor 128. In one embodiment authenticity of local software monitor is established by utilizing a chain of attestation via one or more attestation schemes in nonlimiting example, via DAA to verify that a secure computing module 112 is an authentic secure computing module 112 that has the property of attested time. Generating a secure timestamp may be used to weed out spoofs or "man in the middle attacks."

Continuing to view FIG. 2, a non-limiting example illustrating, an attested boot sequence in a processor with at least one core is presented; this example is provided for expository purposes, and implementation of attested boot, related secure programming using originating device 104 and/or system 100 may be performed according to any processes and/or procedures that may occur to persons skilled in the art upon reviewing the entirety of this disclosure may operate according to an assumption that originating device 104 has at least a secret generator, which may include without limitation a hardware or software component that is responsible for generating a device-specific secret as described above, whose device specific secret, such as without limitation a cryptographic key pair, has been certified by a manufacturer of at least a secret generator, system 100, originating and/or other component or module described herein, such that one may evaluate the authenticity of the device by proof of possession of a valid signature; a device specific secret has been certified by a manufacturer, as used herein, where the manufacturer, or a device operated by the manufacturer, signs a verification datum, such as a public key, generated by at least a secret generator and/or device identifier circuit 124 using the device-specific secret. In nonlimiting example, certification may include directly signing the secret, or may include certifying validity by signing the corresponding secret key. Digital signature of manufacturer may be any digital signature as described above. As a result, a verification datum signed by manufacturer may be linked to secure proofs generated by device identifier circuit 124 using device-specific secret, such that manufacturer signature identifies system 100. In an embodiment, link of the manufacturer signature to device-specific secret may be used to verify authenticity of the local software monitor by authentic signature of the device and cryptographic proof of construction of the local software monitor. Digital signature may alternatively be issued and/or signed in any manner described in this disclosure by a certificate authority, including without limitation a distributed certificate authority. A distributed certificate authority, and related topics are further described in Provisional Application No. 62/758,367 filed on Nov. 9, 2018 and entitled "METHOD AND SYSTEM FOR A DISTRIBUTED CERTIFICATE AUTHORITY" the entirety of which is herein incorporated by reference.

Figure 3:
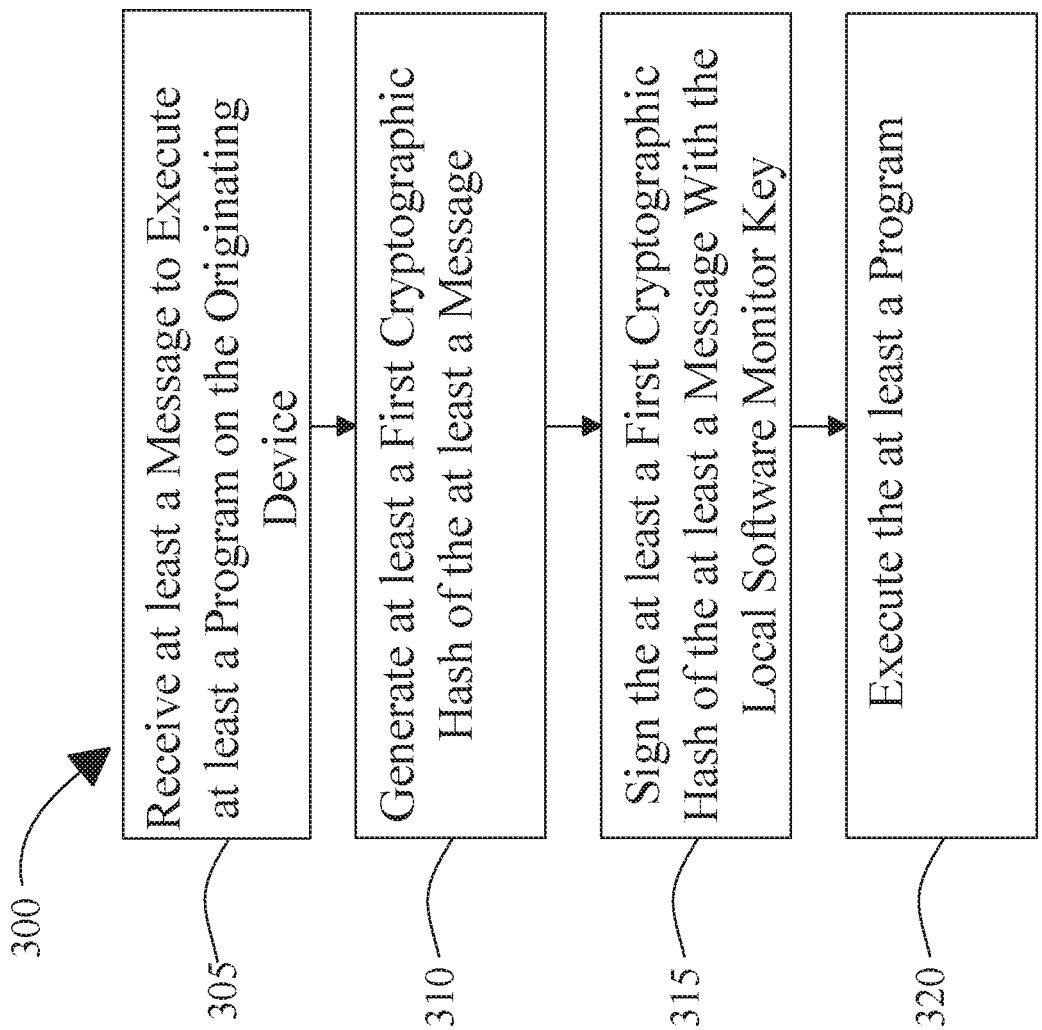
FIG. 3 is a flow diagram illustrating an exemplary embodiment of loading a local software monitor at an originating device.

Referring now to FIG. 3, an exemplary embodiment of a method 300 of attested computing at originating device 104 is illustrated. At step 305, local software monitor receives at least a command to execute at least a program on originating device 104. At least a command may include information directing local software monitor as to which program to execute on originating device 104. Program may include program modules including, but not limited to, an operating system, one or more application programs, other program modules, program data, and any combinations thereof. Program may include for example, page map, threading information, thread state(s), software locks and/or mutexes, validity of protection domain allocation, host application program counter and stack pointer, remote device 140a-n page table base address, thread entry point, thread entry stack pointer, fault handler for program counter and stack counter, fault registers, and asynchronous state registers, runtime code, application code, application data, system call proxy mechanisms, as well as communication primitives, e.g. mailboxes for receiving messages from other remote devices 140a-n, and so forth. Receiving may include obtaining from originating device 104 message through a secure tunnel, through which originating device 104 may deliver message to execute at least a program. Receiving may include obtaining from originating device 104 message through a communication network, for example, a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof.

With continued reference to FIG. 3, at step 310 first software monitor generates at least a first cryptographic hash of the at least a command; first cryptographic hash may be generated using any method described above for generation of a cryptographic hash.

With continued reference to FIG. 3, at step 315 local software monitor digitally signs the at least a first cryptographic hash of the at least a command. This may be performed using local software monitor key. Local software monitor key may be used to check the authenticity of the local software monitor. Local software monitor key may include any of the keys as described above in FIGS. 1-2. Local software monitor key may be generated using any of the methods as described above in FIGS. 1-2. Alternatively or additionally, software monitor may be configured to sign the at least a cryptographic hash by generating an anonymized signature set. Anonymized signature set may include a modified identifier of the software monitor. Anonymized signature set may include a modified signature including a secure proof of device-specific secret; the modified signature may sign a modified message referencing the modified first verification datum. Modified signature may sign the at least a cryptographic hash; alternatively or additionally, delegation may be performed by generating a signature signing the cryptographic hash using local software monitor key and/or a secret possessed by local software monitor, where a digital signature produced thereby may be anonymized in turn. Anonymized signature set may include a modified verification datum based on the verification datum, wherein the modified verification datum verifies the modified signature. For example, the mercurial signature scheme of Crites and Lysyanskaya allows such modified verification data and modified signature. Generation of modified signature sets may be performed, without limitation, as described in U.S. Provisional Application 62/815,493, incorporated above by reference.

Signing the at least a first cryptographic hash of the at least a command may be done using any digital signature protocol as described above. Signing the at least a first cryptographic hash may include performing a secure proof. Secure proof may include any of the secure proofs as described above in reference to FIGS. 1-2.

With continued reference to FIG. 3, at step 320 local software monitor executes the at least a program. Executing as used herein includes running the at least a program on originating device 104. Running may include loading and/or starting the at least a program.

Referring again to FIG. 2, at step 215 originating device 104 generates a digital signature conferring a credential to the local software module. Credential may include, without limitation, an indication that secure computing module and/or originating device is authorizing software monitor 132 to perform further attested computing operations as described herein. Generating may include generating a secure proof of possession of the device-specific secret using the device identifier circuit. Secure proof may include any of the secure proofs as described above in FIGS. 1-2. Secure proof may identify local software monitor. Identification of local software monitor may include an identifier containing a distinct element that is unique only to local software monitor. Identifier may include for example, a verification datum linked with local software monitor key as described above. Identifier may include a measurement of local software monitor as described in more detail above. Originating device 104 further generates a verification datum of the device-specific secret, where the verification datum may include any verification datum as described above. In an embodiment, software monitor 132 is further configured to sign at least a cryptographic hash of a of at least a command, at least a program, a software application, inputs, outputs, and/or data by generating an anonymized signature set, which may be implemented as described above. For instance, and without limitation, anonymized signature set may include a modified identifier of the software monitor. Anonymized signature set may include a modified signature, where the modified signature includes a secure proof of the device-specific secret. Modified signature may sign a modified message referencing modified first verification datum. Modified signature may sign at least a cryptographic hash. Modified signature set may include a modified verification datum based on the verification datum, wherein the modified verification datum verifies the modified signature.

With continued reference to FIG. 2, local software monitor may be configured to perform delegation of authorization to a software application. Delegation includes generating a delegation signatures which includes a secure proof of the local software monitor key and an identifier of the software application. Identifier may include for example, a verification datum associated with software application key. Verification datum may include any of the verification datums as described above. Verification datum may be utilized to authenticate local software monitor key. Verification datum may be linked to local software monitor key. Linking may include associating verification datum with software application key. Software application key may be a key which grants authority to local software monitor to authorize programs to run on originating device. In an embodiment, local software monitor key may be revoked whereby subsequent programs are not authorized to be executed on originating device. In an embodiment, downstream devices may revoke local software monitor key so that additional programs are not authorized to execute on remote devices. In such an instance, revocation may be of local software monitor key and not to the authorization for local software monitor to run generated by originating device 104. Identifier may include a measurement of software application. Delegation signature may be utilized to delegate authorization credentials from originating device 104 to a remote device 140a-n. Delegation signature may be utilized to delegate remote software monitor 136 on remote device 140a-n. Delegation signature may be different from digital signature generated by originating signature. Using for example, an anonymized attestation chain originating device 104 may transform its signature into a subsequent equivalent and unlinkable signature that can sign a new message with a new public key and load a new software monitor. This chain of attestation allows for the new message to be unable to be linked back to the original message and the delegation signature to be unable to be linked back to the digital signature. Anonymous attestation can be utilized by subsequent devices downstream in the attestation chain to perform authentication without identification of previous devices upstream in the attestation chain. Attestation chain allows for implementation of delegable anonymous credentials. This may be implemented, without limitation, as described in U.S. Provisional Application 62/815,493, incorporated herein by reference.

Still viewing FIG. 2, in an embodiment, one or more devices and/or authorities may revoke credentials such as delegation signature and/or local software monitor signature. For example, remote device 140a-n, a manufacturer, and/or a certificate authority may revoke authorization. Revocation may include revoking remote software monitor 136 signature. Revocation may include revocation of delegation signature, which may revoke right of remote software monitor 136 to run on remote device 140a-n. In an embodiment, a certificate authority and/or manufacturer may maintain a revocation list, which may, upon revocation, be updated to list a verification datum associated with delegation signature and/or local software monitor signature. Revocation list may be implemented using any local and/or distributed data structure as described in Provisional Application No. 62/758,367, incorporated by reference above. Revocation, anonymization, and/or implementation of attestation chains may be performed using any means or method as described in U.S. Provisional Application 62/815,493, filed on Mar. 8, 2019 and titled "METHODS AND SYSTEMS FOR IMPLEMENTING AN ANONYMIZED ATTESTATION CHAIN," the entirety of which is incorporated herein by reference.

With continued reference to FIG. 2, originating device 104 deactivates secure computing module. Deactivation may include turning secure computing module off and/or entering a dormant state. In an embodiment, originating device 104 may deactivate secure computing module during time that the originating processor 128 is working. For example, when originating processor 128 loads local software monitor, and generates a digital signature authorizing the local software module, originating device 104 may deactivate secure computing module. Deactivation may occur at any time after local software monitor has been loaded at originating device 104. A boot sequence performed according to method includes generation of a proof and/or secure proof of at least a device-specific and/or device-specific secret by secure computing module, followed by disabling of the module generating the secure proof, including without limitation disabling of a secret generator and/or a device identification circuit, as well as disabling of access to circuit, memory, region, or the like serving or string sequence; software monitor may be evaluated and/or loaded only after disabling and/or deactivation, in an embodiment. Generation of at least a secret may include generation of a number of signatures from the device secret generator, such as without limitation CL signatures, one time use signatures, and the like, such that unlinkability properties may be maintained by non-repeating use of these signatures, which may be subsequently encrypted and stored in memory for future use. Additionally or alternatively, the secret generator may generate at least a mercurial signature, which may subsequently delegate properties to other signatures. Access to the secret generator may be restricted to a specific time in the boot sequence, such that future access to the secret generator require partial or complete reset of the device to prevent unwanted access to the generator.

Figure 4:
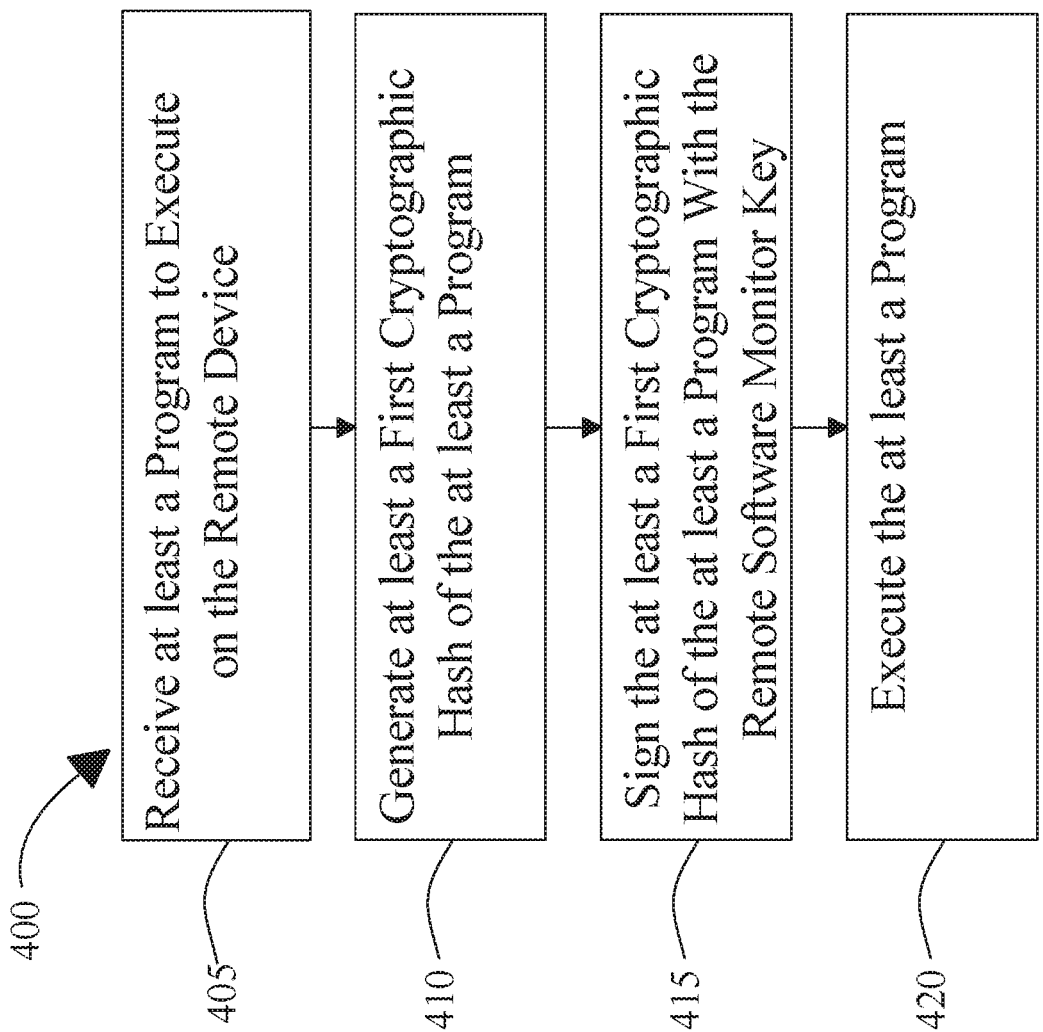
FIG. 4 is a flow diagram illustrating an exemplary embodiment of installing a remote software monitor on a remote device.

Referring now to FIG. 4, a method 400 for installing remote software monitor 136 on a remote device 140a-n is illustrated. Remote software monitor 136 may include any of the software monitors as described above in FIG. 103. Remote software monitor 136 may include a remote software monitor key. Remote software monitor key may be used to check the authenticity of the remote software monitor 136. Remote software monitor key may include any of the software monitor keys as described above in FIGS. 1-3. At step 405 remote software monitor 136 receives at least a program to execute on the remote device 140a-n. Program may include any of the programs as described above in FIG. 3, including for example an operating system, one or more application programs, other program modules, program data, and any combination thereof. Receiving may include obtaining from originating device 104 at least a program to execute on the remote device 140a-n through a secure tunnel, and/or through a communication network as described in more detail above in FIG. 3.

With continued reference to FIG. 4, at step 410 remote software monitor 136 generates at least a first cryptographic hash of the at least a program; first cryptographic hash may be generated using any method described above for generation of a cryptographic hash.

With continued reference to FIG. 4, at step 415 remote software monitor 136 signs the at least a first cryptographic hash of the at least a program; this may be performed using any form of digital signature usable for first software monitor to sign a cryptographic hash as described above, including by generation of a modified signature set based on a signature set generated by first software monitor, which may be generated by remote software monitor as described above. with the remote software monitor key. Remote software monitor key may be used to check the authenticity of the remote software monitor 136. Remote software monitor key may include any of the keys as described above in FIGS. 1-3. Remote software monitor key may be generated using any of the methods as described above in FIG. 103. Signing the at last a first cryptographic hash of the at least a command may be done using any digital signature protocol as described above. Signing the at least a first cryptographic hash may include performing a secure proof. Secure proof may include any of the secure proofs as described above in reference to FIGS. 1-2.

With continued reference to FIG. 4, at step 420 remote software monitor 136 executes the at least a program. Executing as used herein includes running the at least a program on remote device 140*a-n*. Running may include launching and/or starting the at least a program. First remote software monitor may be configured to install second remote software monitor on a second device.

As a non-limiting example, and for illustrative purposes, one or more steps of method 200, 300, or 400 may be performed using anonymous hardware attestation. Included herein is a simple description of an anonymous hardware attestation scheme and a discussion of how anonymous hardware attestation is different from direct anonymous attestation. In an exemplary embodiment of a hardware attestation scheme without anonymity features, an issuer (a.k.a. the manufacturer) I identified with a public key $PK_I$ may provide a credential $Cred_D$ to a trusted hardware device, such as without limitation originating device 104 and/or a component thereof such as secure computing module 112, associated with a public key $PK_D$ and a hardware secret key $HK_D$; a purpose of this piece of hardware may be to attest that a software application running on its host machine has particular characteristics (with respect to some well-defined criteria that are outside of the model). At boot time, a device, such as without limitation originating device 104 and/or a component thereof such as secure computing module 112, may make measurements $m_0$ of the software system $S_0$ that boots on the machine, and uses its credential $Cred_D$ to certify m along with the public key $PK_{S0}$ of $S_0$, resulting in a credential $Cred_0$. To verify that $PK_{S0}$ corresponds to software with measurements $m_0$ running on a credentialled device, another party and/or device performing the verification may require the values ($PK_I;PK_D$; $Cred_D$; $PK_{S0};m_0$; $Cred_0$) and may need to run appropriate verification algorithms to verify $Cred_D$ and $Cred_0$. Further, an initially credentialed $S_0$ may certify that a software application $S_1$ has measurements $m_1$, $S_1$ may certify $S_2$, and so on. Finally, a software application may sign some message M for an external interlocutor; to verify the resulting signature σ on M, one would need the entire certification chain. Such an attestation scheme is anonymous if the signature σ and the certification chain attached to it cannot be linked to the identity of the trusted hardware a device, such as without limitation originating device 104 and/or a component thereof such as secure computing module 112; in other words, an algorithm may be in place that anonymizes the certification chain. A verifier may establish a unique pseudonym with a device, such as without limitation originating device 104 and/or a component thereof such as secure computing module 112, or with a software program a software application running on the machine associated with the device. This pseudonym may be a function of both the identity/keys of a device, such as without limitation originating device 104 and/or a component thereof such as secure computing module 112, or a software application and the context in which it arises; to ensure that it does not reveal the identity of a device, such as without limitation originating device 104 and/or a component thereof such as secure computing module 112, or S, this function may be pseudo-random.

In an exemplary embodiment, methods and systems as described above may differ from the above-described non-anonymized example in a number of ways. As a non-limiting example, a device, such as without limitation originating device 104 and/or a component thereof such as secure computing module 112, which may be secure hardware module 112, may solely measure the software that boots up when the device is turned on, and certify that software with measurement m has booted up; after that, the device and/or secure hardware module may go dormant, its key inaccessible. As a result a hardware secret key HK may be maximally protected, for instance by minimizing the time and situations in which it may theoretically be exposed to attack. As a result, a software system running on a machine with embodiments of systems, software, programs, components, or other elements described herein may be in possession of all the keys it needs to certify applications running on top of it and for signing messages it sends to the outside world. Therefore, if it is a trustworthy, secure application, certifications originating from it are meaningful. If, however, the machine booted some malicious software system instead of a good one, its attestations may not be meaningful at all; in fact the malicious software system may leak its secret key and credentials to an outside, malicious adversary. (For example, D may compute a cryptographic hash of the software system booting up, resulting in measurement $m_0$). To forestall this possibility, credentials may only be verifiable relative to the measurement m taken at boot time by the trusted a device, such as without limitation originating device 104 and/or a component thereof such as secure computing module 112, such as a secure hardware module 112, so if the software system with measurement m is known to be faulty, its credentials are not very valuable. In contrast, in DAA the hardware component responsible for performing attestation (called the "trusted platform module," or TPM) must be involved in every instance of the attestation/signing protocol, and as a result even a malicious software system running on such a device cannot leak the keys needed for attestation to an outside adversary. In other words, requires a specific machine with this a specific hardware device in order to perform attestations. However, it can still cause the device to attest whatever statements it needs, and so a machine that's running a malicious software system is not immune from performing corrupted attestations in the DAA scenario either. Moreover, the burden of participating in every attestation may be onerous indeed a lot of DAA literature focuses on lightening this computational burden and letting the untrusted software "host" perform the bulk of the computation. In a further improvement, in methods and systems as described herein, a device may delegate, over a trusted connection, attestation of a software process or hardware-assisted secure container (an enclave) to a more secure device, a trusted connection between at least a designated "signing enclave" and the secure. In an example a trusted connection established between, for Instance a host processor and a TPM may enable the TPM to act as a "signing enclave" for an enclave on the host, enabling a remote party to have a degree of confidence in the attestation arising from the fact that the TPM may store long-lived cryptographic keys without leakage via side-channels.

As a further improvement over existing methods and systems, in methods and systems as described herein, an attestation obtained from one application (say, a payment app) looks different from that of another application (say, a gaming app), and such attestations can be carried out directly by their software apps, without the need to make a call all the way down the software stack; as a result, there is no need to verify a chain of certificates from a manufacturer to a device such as originating device 104 and/or secure computing module 112. DAA does not have this ability, since all attestations are performed by the TPM.

Methods and systems as described above may make revocation of authorization possible in situations where it is impossible to get a device's secret key out of the device, even for a device manufactured by the correct, honest process. For example, the key may correspond to a PUF. Revocation of software keys and/or signatures, such as without limitation local software monitor key and/or delegation signature or a key used to generate the delegation signature, may not depend on information concerning hardware keys, and thus may be able to function effectively where the hardware key is unavailable.

In a non-limiting example, to accomplish advantages as described above, systems and methods as described herein may implement the following protocols: (1) DDelegate: an algorithm that delegates the credential belonging to the a device, such as without limitation originating device 104 and/or a component thereof such as secure computing module 112, to a software system and/or application $S_0$ running on the machine; and (2) SDelegate: an algorithm that delegates the credential belonging to a software application $S_i$ to its child application $S_{i+1}$. There may also be, in a non-limiting example, a separate key generation algorithm for the hardware device and software application, while in pre-DAA there was a single key generation algorithm for a user. In an embodiment, both issue protocols and delegate algorithms may take as input and certify attributes associated with the device or software application that's being credentialed. Secret keys of faulty devices may not be exposed; instead signatures originating from faulty devices may be exposed, for instance as described above; In the event that a verifier needs to make sure that it's talking to a device whose signature is not on a blacklist, the non-faulty device may implement a process to exculpate itself, and compute a zero-knowledge proof that the bad signatures were under another device's key; this may be performed using an Exculpate algorithm which, on input a signature σ originating with a faulty device and the secret key of a supposedly non-faulty a device, such as without limitation originating device 104 and/or a component thereof such as secure computing module 112, produces a proof that a device did not issue a, i.e. the device is a credentialled device whose secret key is distinct from that of whichever device produced a.

In a non-limiting example, systems and methods as described herein may implement or involve protocols, and or all of which may be implemented as described above, and which may include, without limitation:

(a) Setup;
(b) Manufacturer's key generation (Manufacturer and issuer may be the same entity);
(c) Device hardware key generation, which may be performed, without limitation, using device identifier circuit 124;
(d) Software app's key generation, which may be generated according to one or more processes or protocols as described above for local software monitor and/or delegation;
(e) A Join and/or Issue Protocol between issuer/manufacturer and hardware device, whereby the device receives a credential;
(f) Hardware delegation whereby a device such as without limitation originating device 104 and/or secure computing module 112 gives a credential to a software app, which may be implemented for example as described above in reference to FIGS. 2-4 (for instance incorporating some measurement m and other attributes, which may include temporal attributes such as expiration dates of delegated credentials)
(g) Software delegation A parent software app Sp gives a credential to a child software app which may be implemented for example as described above in reference to FIGS. 2-4 and which may include any attribute suitable for inclusion in hardware delegation;
(h) Pseudonym generation, which may potentially include a different algorithm depending on whether the pseudonym is for device or software application;
(i) Signature, whereby a software application to which a credential has been delegated signs a message M, possibly on behalf of its pseudonym
(j) Signature verification
(k) Identification: this algorithm exists for the purposes of defining security, so that there is a way to associate devices and software apps with their secret keys.

Exculpate; a process whereby a device such as originating device 104 and/or secure computing module 112 proves it didn't issue a signature a, which may include for instance a faulty and/or revoked signature.

Figure 5:
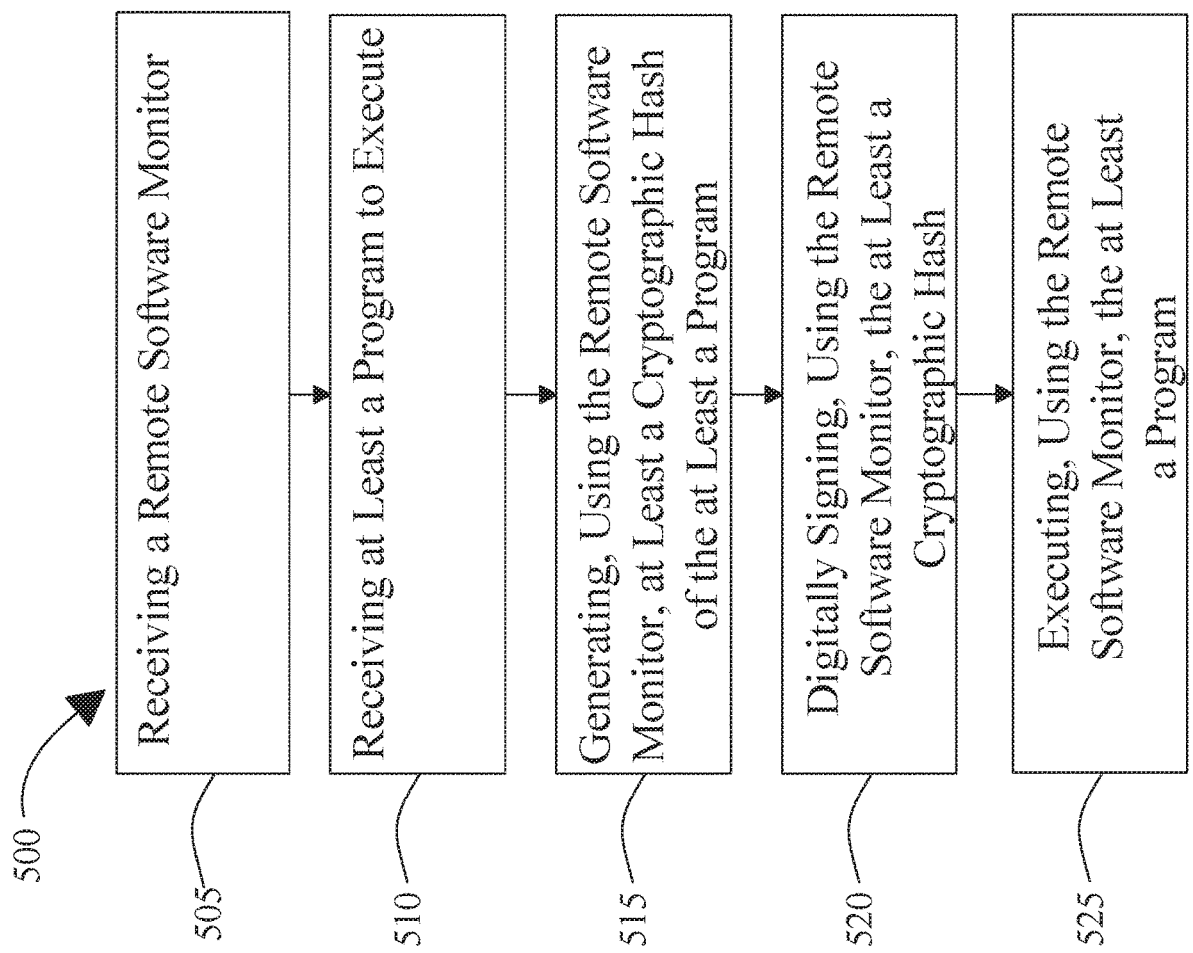
FIG. 5 is a flow diagram illustrating an exemplary embodiment of a method of anonymous hardware attestation.

Referring now to FIG. 5, an exemplary embodiment of a method 500 of anonymous hardware attestation is illustrated. At step 505, a computing device receives from an originating device a remote software monitor; this may be implemented, without limitation, as described above in reference to FIGS. 1-4. At step 510, computing device receives, using remote software monitor, at least a program to execute on the computing device; this may be implemented, without limitation, as described above in reference to FIGS. 1-4. At step 415, the computing device generates, using the remote software monitor, at least a first cryptographic hash of the at least a program; this may be implemented, without limitation, as described above in reference to FIGS. 1-4. At step 520, the computing device digitally signs the at least a first cryptographic hash of the at least a program using the remote software monitor; this may be implemented, without limitation, as described above in reference to FIGS. 1-4. At step 525, computing device executes the at least a program using the remote software monitor; this may be implemented, without limitation, as described above in reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
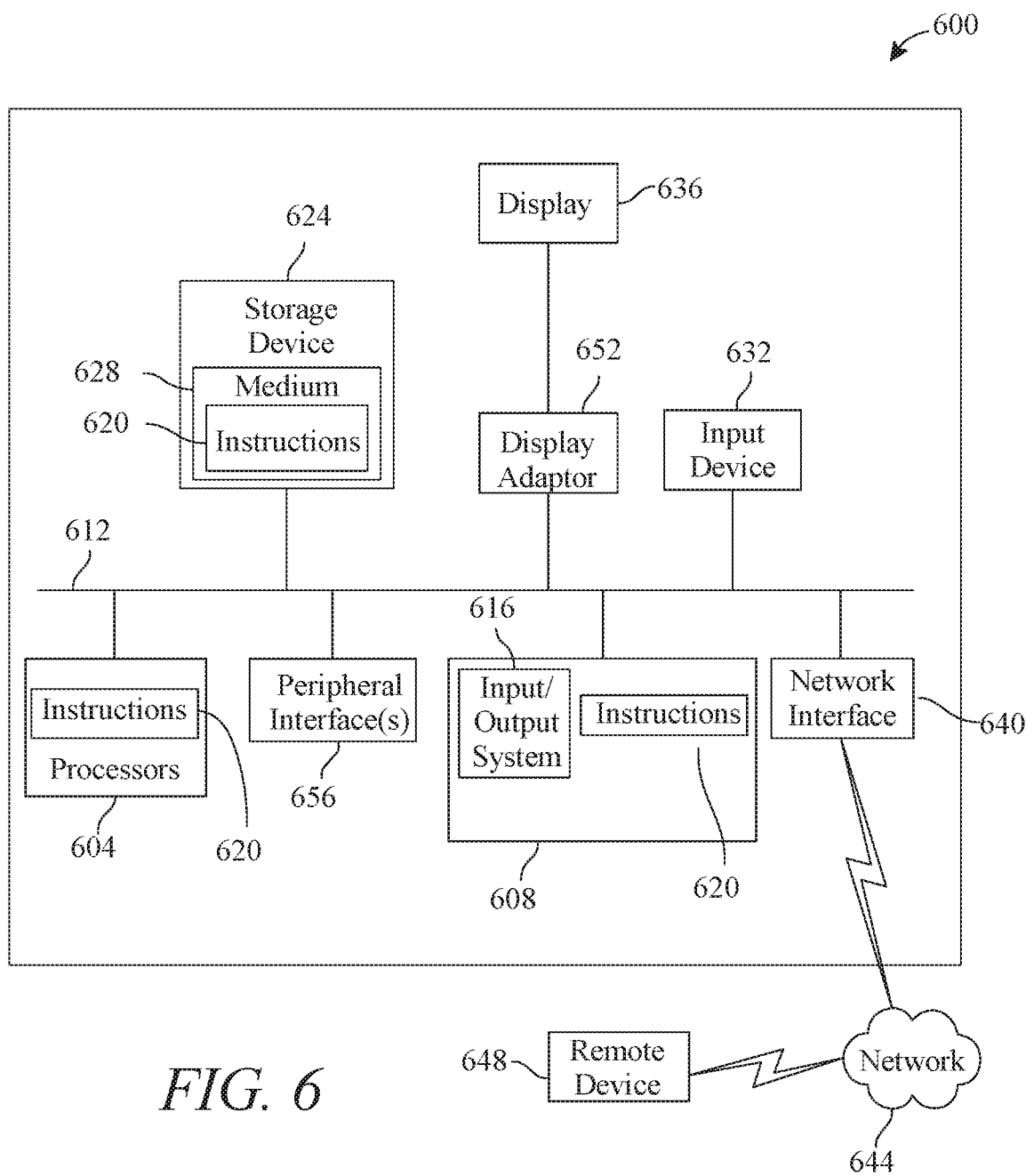
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for anonymous hardware attestation, the system comprising:
   an originating device, the originating device comprising a secure computing module, the secure computing module including a device identifier circuit designed and configured to generate a secure proof of a device-specific secret of the originating device; and
   an originating processor, the originating processor designed and configured to:
     activate the secure computing module;
     load a local software monitor, wherein the local software monitor is configured to:
       receive at least a command to execute at least a program on the originating device;
       generate at least a first cryptographic hash of the at least a command;
       digitally sign the at least a first cryptographic hash of the at least command; and
       execute the at least a program;
     generate:
       a digital signature conferring a credential to the local software module and signing a message including an identifier of the local software monitor, wherein generating further comprises generating a secure proof of the device-specific secret using the device identifier circuit; and
       a verification datum of the device-specific secret; and
     deactivate the secure computing module;
   wherein the local software monitor is further configured to digitally sign the at least a first cryptographic hash by:
     generating an anonymized signature set, wherein the anonymized signature set further comprises:
       a modified identifier of the software monitor;
       a modified signature, wherein:
         the modified signature comprises a secure proof of the device-specific secret;
         the modified signature signs a modified message referencing the modified first verification datum; and
         the modified signature signs the at least a cryptographic hash; and
       a modified verification datum based on the verification datum, wherein the modified verification datum verifies the modified signature.

2. The system of claim 1, wherein the originating processor is configured to load the local software monitor at boot time.

3. The system of claim 1, wherein the originating processor is configured to load the local software monitor using the secure computing module.

4. The system of claim 1, wherein the secure proof further comprises a physically unclonable function.

5. The system of claim 1, wherein the identifier of the local software monitor further comprises a verification datum linked with a local software monitor key.

6. The system of claim 1, wherein the message includes a measurement of the local software monitor.

7. The system of claim 1, wherein the local software monitor is further configured to perform delegation of authorization to a software application, where delegation further comprises generating a delegation signature.

8. The system of claim 7, wherein the software application further comprises a remote software monitor, and the local software monitor is further configured to:
   install the remote software monitor on a first remote device, wherein the remote software monitor is configured to:
   receive at least a program to execute on the remote device;
   generate at least a first cryptographic hash of the at least a program;
   digitally sign the at least a first cryptographic hash of the at least a program; and
   execute the at least a program.

9. The system of claim 8, wherein the at least a first remote software monitor is further configured to install at least a second remote software monitor on at least a second remote device.

10. A method of anonymous hardware attestation, the method comprising:
   activating, by an originating processor of an originating device, a secure computing module, the secure computing module including a device identifier circuit configured to generate a secure proof of a device specific secret of the originating device;
   loading, by the originating processor, a local software monitor, wherein the local software monitor is configured to:
     receive at least a command to execute at least a program on the originating device;
     generate at least a first cryptographic hash of the at least a command;
     digitally sign the at least a first cryptographic hash of the at least a command; and
     execute the at least a program;
   generating, by the originating processor:
     a digital signature conferring a credential to the local software module and signing an identifier of the local software monitor, wherein generating further comprises generating a secure proof of the device-specific secret using the device identifier circuit; and
     a verification datum of the device-specific secret; and
   deactivating, by the originating processor, the secure computing module;

wherein the local software monitor is further configured to digitally sign the at least a first cryptographic hash by:
generating an anonymized signature set, wherein the anonymized signature set further comprises:
a modified identifier of the software monitor;
a modified signature, wherein:
the modified signature comprises a secure proof of the device-specific secret;
the modified signature signs a modified message referencing the modified first verification datum; and
the modified signature signs the at least a cryptographic hash; and
a modified verification datum based on the verification datum, wherein the modified verification datum verifies the modified signature.

11. The method of claim 10, wherein loading the local software monitor occurs at boot time.

12. The system of claim 10, loading the local software monitor further comprises loading the local software monitor using the secure computing module.

13. The system of claim 10, wherein the secure proof further comprises a physically unclonable function.

14. The system of claim 10, wherein the identifier of the local software monitor further comprises a verification datum linked with a local software monitor key.

15. The system of claim 10, wherein the local software monitor is further configured to perform delegation of authorization to a software application, where delegation further comprises generating a delegation signature.

16. The method of claim 15, wherein the software application further comprises a remote software monitor, and the local software monitor is further configured to:
install the remote software monitor on a first remote device, wherein the remote software monitor is configured to:
receive at least a program to execute on the remote device;
generate at least a first cryptographic hash of the at least a program;
digitally sign the at least a first cryptographic hash of the at least a program; and
execute the at least a program.

17. The method of claim 10, wherein the at least a first remote software monitor is further configured to install at least a second remote software monitor on at least a second remote device.

* * * * *